Figure 6:
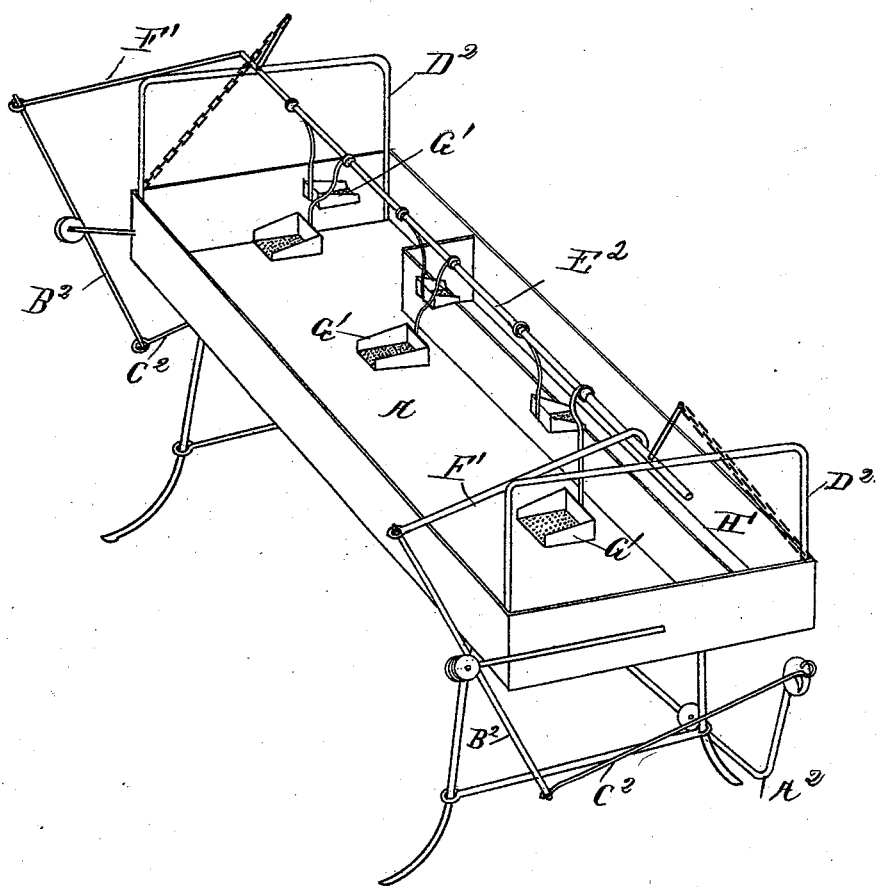

(No Model.) 3 Sheets—Sheet 1.
D. JONES.
EVAPORATING PAN.
No. 392,864. Patented Nov. 13, 1888.
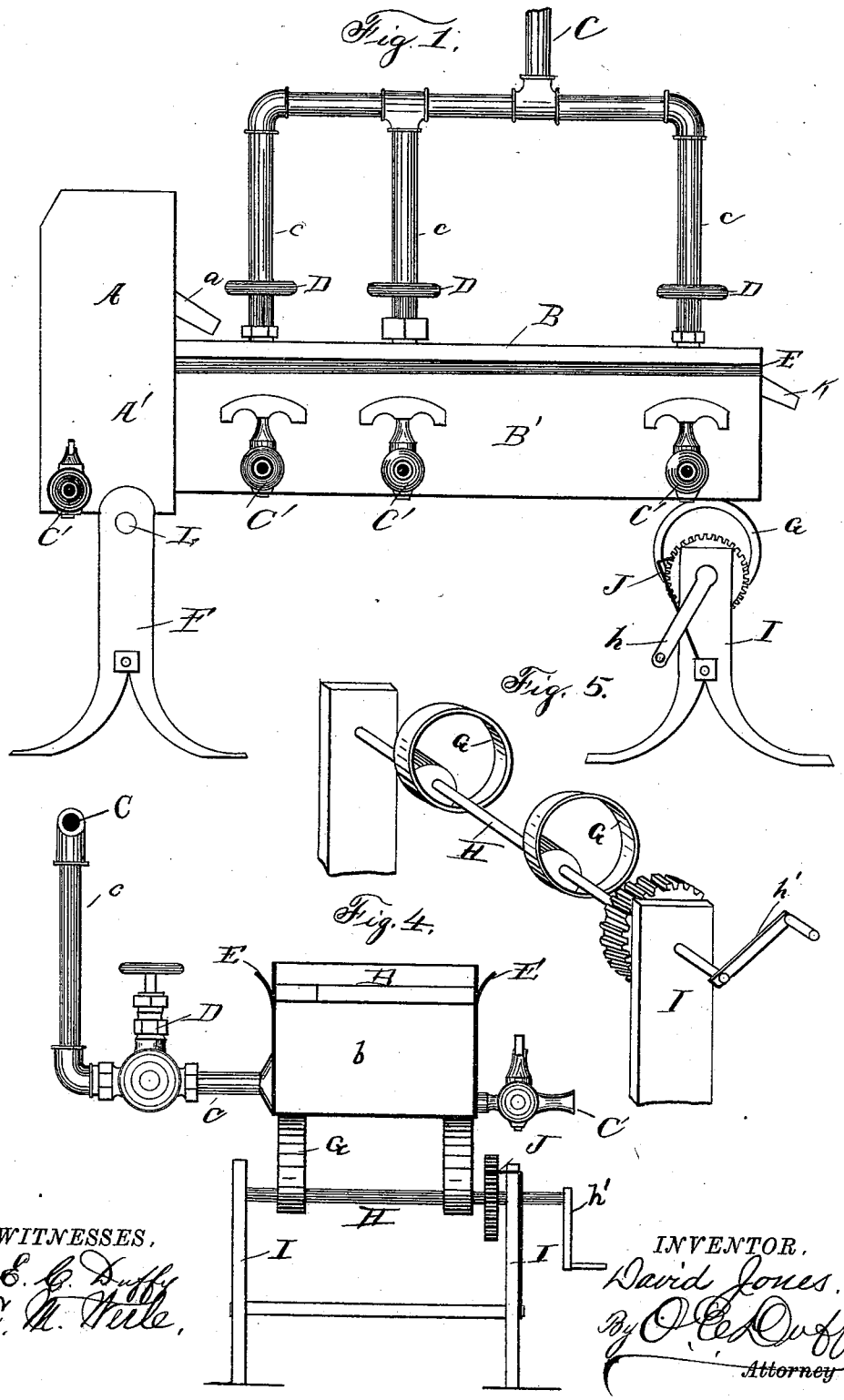

(No Model.) 3 Sheets—Sheet 2.
D. JONES.
EVAPORATING PAN.
No. 392,864. Patented Nov. 13, 1888.
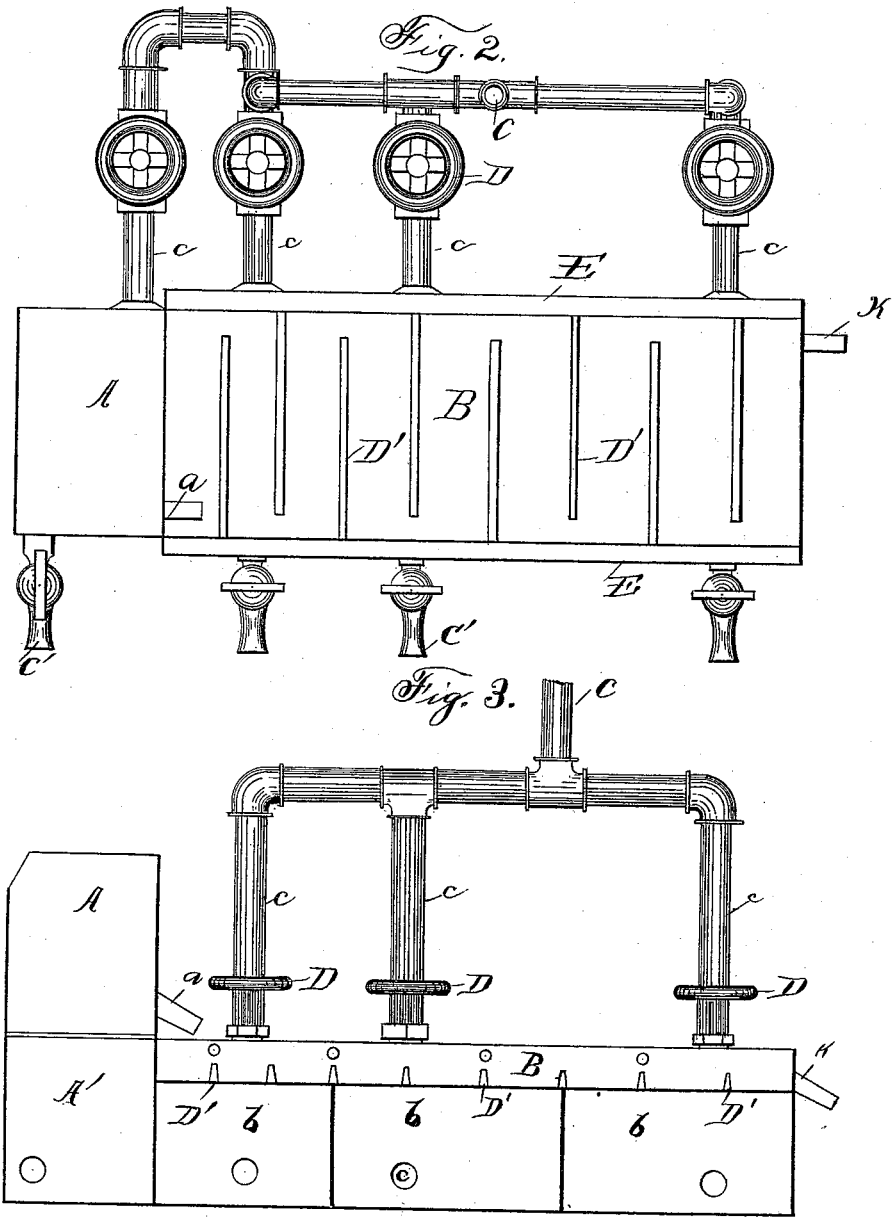
WITNESSES:
E. C. Duffy.
H. E. Peck.
INVENTOR:
David Jones.
By O. E. Duffy
Attorney.

(No Model.) 3 Sheets—Sheet 3.

D. JONES.
EVAPORATING PAN.

No. 392,864. Patented Nov. 13, 1888.

WITNESSES.
E. C. Duffy.
H. E. Peck.

INVENTOR.
David Jones,
per O. E. Duffy
Attorney

N. PETERS, Photo-Lithographer, Washington, D. C.

UNITED STATES PATENT OFFICE.

DAVID JONES, OF PARIS, TENNESSEE, ASSIGNOR OF ONE-HALF TO WILLIAM C. WILLIAMS, OF SAME PLACE.

EVAPORATING-PAN.

SPECIFICATION forming part of Letters Patent No. 392,864, dated November 13, 1888.

Application filed June 30, 1888. Serial No. 478,626. (No model.)

*To all whom it may concern:*

Be it known that I, DAVID JONES, of Paris, in the county of Henry and State of Tennessee, have invented certain new and useful Improvements in Evaporating-Pans; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in evaporating-pans and attachments for the same.

The object of my invention is to produce an evaporating-pan which shall be cheap in first cost, exceedingly simple and effective in operation, and easily understood and operated by any and all persons, and by which sugar, preserves, sirup, &c., can be entirely cooked or evaporated, and also fruits can be canned and sorghum made without the least danger of scorching, burning, or smoking, thus adapting the device for household as well as manufacturers' use.

With these ends in view my invention consists in certain novel features of construction and combinations of parts, more fully described hereinafter, and particularly pointed out in the claims.

Referring to the accompanying drawings, Figure 1 is a front elevation. Fig. 2 is a top plan. Fig. 3 is a vertical longitudinal section, the supports being removed. Fig. 4 is a vertical cross-section, the supports or standards being removed. Fig. 5 is a detail perspective view of the mechanism for raising and lowering the free end of the evaporating-pan, and Fig. 6 is a perspective view of a skimmer.

In the drawings, the reference-letter A indicates a heating-vessel, and B an evaporating-pan, said heater being located at one end of and above the evaporating-pan, so that the contents of the same can be allowed to flow into the evaporating-pan through a spout or tube, a, after being sufficiently cooked.

The heater A is provided with a steam or hot-air chamber, A', beneath it, and the evaporating-pan is also provided with a steam or hot-air chamber, B', beneath it, having two vertical partitions dividing the chamber into three steam or hot-air compartments, b.

C indicates a main steam or hot-air supply pipe, from which branch pipes c extend. Each of the steam-chambers b, and also the steam chamber A', being provided with one or the independent branch pipes c, supplying steam from the main pipe C, and each of said branch pipes is provided with a valve, b, whereby the flow of steam into each chamber can be independently regulated or entirely cut off as desired. Each one of said steam-chambers is also provided with a steam cock, C', by which the condensed steam can be exhausted from the chambers, as required.

The steam-chambers support the heating and the evaporating pans, and are strongly braced by stay-rods and bolts or other suitable means to withstand considerable steam pressure, or, if desired, the heating and the evaporating-pan and their steam-chambers can be formed of sheet metal suitably bolted together, so that the whole device will be united or in the form of a single pan or vessel divided into the different pans and compartments. It should be observed that the heater is deep and narrow in proportion to the evaporating-pan, which is shallow and preferably of considerable length, to increase the heating surface in contact with the fluid; and in order to still further increase the heated surface with which the fluid comes in contact the evaporating-pan is provided with a series of hollow partitions, D', the interiors of which are in communication with the interiors of the steam-chambers of the evaporating-pan. Said partitions extend alternately from the opposite sides of the pan partially across the bottom of the same, and are of a suitable height. Thus it will be seen that the heating surface of the pan is greatly increased.

In case the contents of the evaporating-pan should boil over the overflow will be caught and passed back into the pan by the side flanges or rims, E, extending outwardly from the outer edges of the pan and forming a gutter around the upper exterior of the pan, and the sides of the pan are perforated at the bottom of said gutter to allow the overflow to pass through the same back into the main pan.

heater end of the tank or device is mounted
 a rock-shaft, L, suitably supported, as
standards F, to allow the opposite end of
tank a limited vertical movement, and the
osite end of the device—that is, the outer
of the evaporating-pan, which is allowed
vertical swing—is movably supported by
trics G, bearing against its lower surface
mounted upon a shaft, H, suitably jour-
d, as in standards I.
he shaft H is provided with a crank, $h'$, or
r means for rotating the same, and with a
l-and-ratchet mechanism, J, for holding
eccentrics, and hence the tank, in the de-
l position. The eccentrics are so mounted
1 their shaft that when they are in an up-
t position the bottom of the heater and of
evaporating-pan will be substantially hori-
al, and as the shaft is rotated, and with it
eccentrics, of course it will be seen that
outer end of the evaporating-pan will be
d and lowered, and said outer or mova-
nd of the evaporating-pan is provided
 a discharge spout or tube, $k$. It will be
that the bottom of the heater and of the
orating-pan preferably form the top
s of their respective steam-chambers.
Fig. 6 a skimmer is shown which op-
es upon and removes the scum from the
ents, preferably, of the heater A. Said
ming device is operated by a shaft, $A^2$,
naled beneath the pan in the supports
he same. $B^2$ indicates a pair of vertical
rs pivoted at about their centers to the
at opposite ends of and extending above
below the same. The lower free ends of
levers are connected to crank-arms on the
t $A^2$ by connecting-links $C^2$. At its oppo-
ends the pan A is provided with the up-
dly-extending frames or supports $D^2$, the
er sides of which form guides or tracks
n which the skimmer-shaft $E^2$ operates
is confined. Said skimmer-shaft is con-
ed with the upper free ends of the levers
y connecting-links $F'$. Scoops or skim-
s $G'$, preferably provided with perforated
oms, are carried by the shaft $E^2$ by means
uitable arms, as shown, extending down
1 the shaft, so that the scoops can enter
contents of the pan. The shaft $A^2$ can be
ated by any suitable means, and as it is
ated the shaft $E^2$ will be reciprocated upon
frames $D^2$ from one end of the same to the
r, with the scoops skimming along the sur-
of the contents in the same. When the
t $E^2$ reaches one end of frames $D^2$, it is
ed by a cord or chain connected to the
 and to an arm extending up from said
t, and when the shaft reaches the limit of
novement in the opposite direction it is
ed by a similar device, the chain on this
being secured to the opposite side of the
. It will be readily understood that when
the shaft is rocked the scoops are lifted from
the liquid and emptied over the edge of the
pan into suitable receptacles (not shown) or
into a receptacle, $H'$, in the pan.

The operation of the device is substantially
and preferably as follows: The compound is
first heated a sufficient amount in the heater
where the scum and impurities rising to the
surface are removed by the skimmer, (shown
in Fig. 6,) after which the contents of the
heater are allowed to flow into the evaporat-
ing-pan through the discharge-spout of the
heating-pan, and after being treated a sufficient
length of time and evaporated the desired
amount in the evaporating-pan the eccentrics
are operated to tilt the evaporator and the
contents of the pans are allowed to flow into
a suitable receptacle through the discharge-
spout $k$.

It is not considered necessary to fully enu-
merate the great advantages or many uses for
which the herein-described device is adapted,
as they will be readily understood and com-
prehended by all persons.

It is evident that various slight changes or
modifications might be made in the form and
arrangement of the parts described without
departing from the spirit and scope of my in-
vention; hence I do not wish to limit myself
strictly to the precise construction herein set
forth, but consider myself entitled to all such
changes.

What I claim is—

1. In an evaporator, an evaporating-pan
provided with a discharge at one end and a
heating vessel at the other end of said pan
deep and narrow in comparison with the same,
and with its bottom in a plane above the pan
and having a discharge-spout, in combination
with a steam-chamber beneath the heater, a
separate steam chamber beneath the evaporat-
ing-pan divided into compartments, a main
steam-supply pipe, branch pipes from the
same to each steam chamber and compart-
ment, and steam-exhausts for each of said
steam chambers and compartments, substan-
tially as set forth.

2. The combination, with a pan provided
with guides or ways, of a skimmer compris-
ing a reciprocating skimmer-shaft extending
over the pan and operating and confined on
said ways, perforated scoops carried by arms
extending downwardly from said shaft, and a
driving-shaft and levers for reciprocating said
skimmer-shaft upon said ways, substantially as
described.

In testimony that I claim the foregoing as
my own I affix my signature in presence of two
witnesses.

DAVID JONES.

Witnesses:
W. E. WELDON,
M. C. McWIND.